US012785188B2

(12) United States Patent
Parsons et al.

(10) Patent No.: US 12,785,188 B2
(45) Date of Patent: Nov. 3, 2026

(54) SYSTEMS AND METHODS FOR A BATTERY PROTECTOR FOR AN ELECTRONIC DEVICE

(71) Applicant: Copeland Cold Chain, LP, Kennesaw, GA (US)

(72) Inventors: Rodney Parsons, West Palm Beach, FL (US); John Cheraso, Boynton Beach, FL (US); Casmir E. Lawler, Jr., Boise, ID (US); Blair Nygren, Tampa, FL (US)

(73) Assignee: Copeland Cold Chain, LP, Kennesaw, GA (US)

(*) Notice: Subject to any disclaimer, the term of this patent is extended or adjusted under 35 U.S.C. 154(b) by 482 days.

(21) Appl. No.: 16/949,492

(22) Filed: Oct. 30, 2020

(65) Prior Publication Data

US 2022/0140298 A1 May 5, 2022

(51) Int. Cl.
*H01M 50/213* (2021.01)

(52) U.S. Cl.
CPC ...... *H01M 50/213* (2021.01); *H01M 2220/30* (2013.01)

(58) Field of Classification Search
CPC ............. H01M 50/213; H01M 50/233; H01M 50/242; H01M 50/202; H01M 50/24; H01M 50/224; H01M 2220/30; G06Q 10/0833; G01S 19/35
See application file for complete search history.

(56) References Cited

U.S. PATENT DOCUMENTS

| | | | | |
|---|---|---|---|---|
| 5,265,275 A * | 11/1993 | Goldenberg | ........... | H04B 1/086 361/814 |
| 10,361,411 B2 | 7/2019 | Dekeuster et al. | | |
| 2009/0148763 A1* | 6/2009 | Hano | ...................... | H01M 6/08 429/174 |

(Continued)

FOREIGN PATENT DOCUMENTS

| | | | |
|---|---|---|---|
| CN | 206074027 U | 4/2017 | |
| CN | 109585714 A * | 4/2019 | .......... H01M 50/116 |

(Continued)

OTHER PUBLICATIONS

Mindat.org, "Definition of crushing strength"; accessed via internet on Jan. 11, 2023 at <https://www.mindat.org/glossary/crushing_strength>. (Year: 2023).*

(Continued)

*Primary Examiner* — Haroon S. Sheikh
*Assistant Examiner* — Drew C Newman
(74) *Attorney, Agent, or Firm* — Armstrong Teasdale LLP

(57) ABSTRACT

A tracking device includes a housing, electronics, a battery, and a battery protection system for protecting the battery. The electronics are disposed within the housing for tracking a position of the tracking device. The battery is electrically connected to the electronics. The battery protection system includes a protective structure defining a protective cavity, and the battery is positioned within the protective cavity. The protective structure prevents damage to the battery when a force of at least about 26 Newtons (N)/square millimeter ($mm^2$) to about 435 N/$mm^2$ is applied to the protective structure.

5 Claims, 12 Drawing Sheets

(56) References Cited

U.S. PATENT DOCUMENTS

| | | | | |
|---|---|---|---|---|
| 2009/0297936 | A1* | 12/2009 | Nemoto | H01M 50/227 429/152 |
| 2011/0077909 | A1* | 3/2011 | Gregory | G01D 9/005 702/187 |
| 2013/0265155 | A1 | 10/2013 | Wible et al. | |
| 2015/0072209 | A1* | 3/2015 | Tyler | B60L 50/16 429/159 |
| 2016/0329538 | A1 | 11/2016 | Hughes | |
| 2018/0108955 | A1* | 4/2018 | Fees | B23K 26/21 |
| 2018/0145292 | A1 | 5/2018 | Lampe-Onnerud et al. | |
| 2019/0221797 | A1 | 7/2019 | Nierhoff et al. | |
| 2019/0225093 | A1 | 7/2019 | Li et al. | |

FOREIGN PATENT DOCUMENTS

| | | | | |
|---|---|---|---|---|
| DE | 102017003140 | A1 * | 10/2018 | H01M 50/50 |
| DE | 102017221260 | A1 | 5/2019 | |
| DE | 202020100396 | U1 | 3/2020 | |
| EP | 2766247 | B1 | 8/2018 | |
| JP | 2014154401 | A * | 8/2014 | |
| WO | 2016179557 | A1 | 11/2016 | |
| WO | 2020008207 | A1 | 1/2020 | |
| WO | 2020056527 | A1 | 3/2020 | |
| WO | WO-2020193600 | A1 * | 10/2020 | B60L 3/0046 |

OTHER PUBLICATIONS

Corrosionpedia, "Compressive strength", Aug. 28, 2019; accessed via web on Jan. 11, 2023 at <https://www.corrosionpedia.com/definition/1620/compressive-strength-material-science>. (Year: 2019).*

RedGaurd (RedGuard, Design & Engineering "The Compressive Strength of Steel", Aug. 28, 2022; accessed via internet on Jan. 9, 2023 at < https://blog.redguard.com/compressive-strength-of-steel#:~:text=Most%20structural%20steel%20has%20a,it%20is%20reinforced%20with%20steel.)>. (Year: 2022).*

English Equivalent to WO-2020193600-A1 (US-20220131227-A1) (Year: 2022).*

Marlin Steel, "Aluminum vs. Stainless Steel: Benefits of Both in Aviation & Aerospace", Apr. 29, 2021, accessed via internet on Jan. 12, 2023 at <https://www.marlinwire.com/blog/aluminum-vs.-stainless-steel-stainless-steel-in-aviation>. (Year: 2021).*

Ashraf, M., Gardner, L., Nethercot, D. A. "Compression strength of stainless steel cross-section", Journal of Constructional Steel Research, 2006, (62), 105-115. (Year: 2006).*

Ragsdale, "Stainless Steel in Aircraft Construction", Trans. ASME, 1933, 55(1), 89-95. (Year: 1933).*

Amtek, "Crush Resistance Testing". Accessed via web on Jul. 28, 2023 at <https://www.ametektest.com/learningzone/testtypes/crush-resistance-testing>. Available Dec. 3, 2015. (Year: 2015).*

English translation of Kleiner et al. (DE-102017003140-A1). (Year: 2018).*

English translation of Takeshi et al. (JP-2014154401-A1). (Year: 2014).*

English translation of Zhan et al. (CN-109585714-A). (Year: 2019).*

International Search Report and Written Opinion for PCT/US2021/056420 dated Feb. 8, 2022, 12 pgs.

Written Opinion of the International Preliminary Examining Authority for PCT/US2021/056420 dated Oct. 5, 2022; pp. 1-8.

European Extended Search Report issued in Application No. 24175010.8 dated Sep. 26, 2024, pp. 1-10.

* cited by examiner

SYSTEMS AND METHODS FOR A BATTERY PROTECTOR FOR AN ELECTRONIC DEVICE

FIELD

The field of the disclosure relates generally to battery-powered electronic devices, and more particularly, to systems and methods for a battery protector for an electronic device.

BACKGROUND

Portable electronics, such as electronic tracking devices, typically include a battery to power electronic components within the electronics. The battery may be a lithium-ion battery that includes an anode, a cathode, and a separator separating the anode and the cathode. For example, the electronic tracking devices may include electronic components, a receiver, and an antenna, and the battery powers the electronic components, the receiver, and the antenna to enable the electronic tracking device to track the position of the electronic tracking device. However, if the electronic tracking device is damaged, the separator of the battery may also be damaged, causing the anode and the cathode to contact each other. Contact between the anode and the cathode may damage the battery, the electronic tracking device, and/or other equipment near the electronic tracking device. A system for protecting the battery is needed.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a tracking device includes a housing, electronics, a battery, and a battery protection system for protecting the battery. The electronics are disposed within the housing for tracking a position of the tracking device. The battery is electrically connected to the electronics. The battery protection system includes a protective structure defining a protective cavity, and the battery is positioned within the protective cavity. The protective structure prevents damage to the battery when a force of at least about 26 Newtons (N)/square millimeter ($mm^2$) to about 435 $N/mm^2$ is applied to the protective structure.

In another aspect, a battery protection system for an electric device includes a protective structure defining a protective cavity and a battery positioned within the protective cavity. The protective structure prevents damage to the battery when a force of about 26 Newtons (N)/square millimeter ($mm^2$) to about 435 $N/mm^2$ is applied to the protective structure.

In yet another aspect, a method of constructing an electronic device includes positioning electronics within a housing of the electric device. The method also includes positioning a battery within a battery protection system. The battery protection system includes a protective structure defining a protective cavity, and the battery is positioned within the protective cavity. The protective structure prevents damage to the battery when a force of about 26

Newtons (N)/square millimeter ($mm^2$) to about 435 $N/mm^2$ is applied to the protective structure. The method further includes electrically connecting the battery to the electronics. The method also includes positioning the battery and the battery protection system within the housing.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
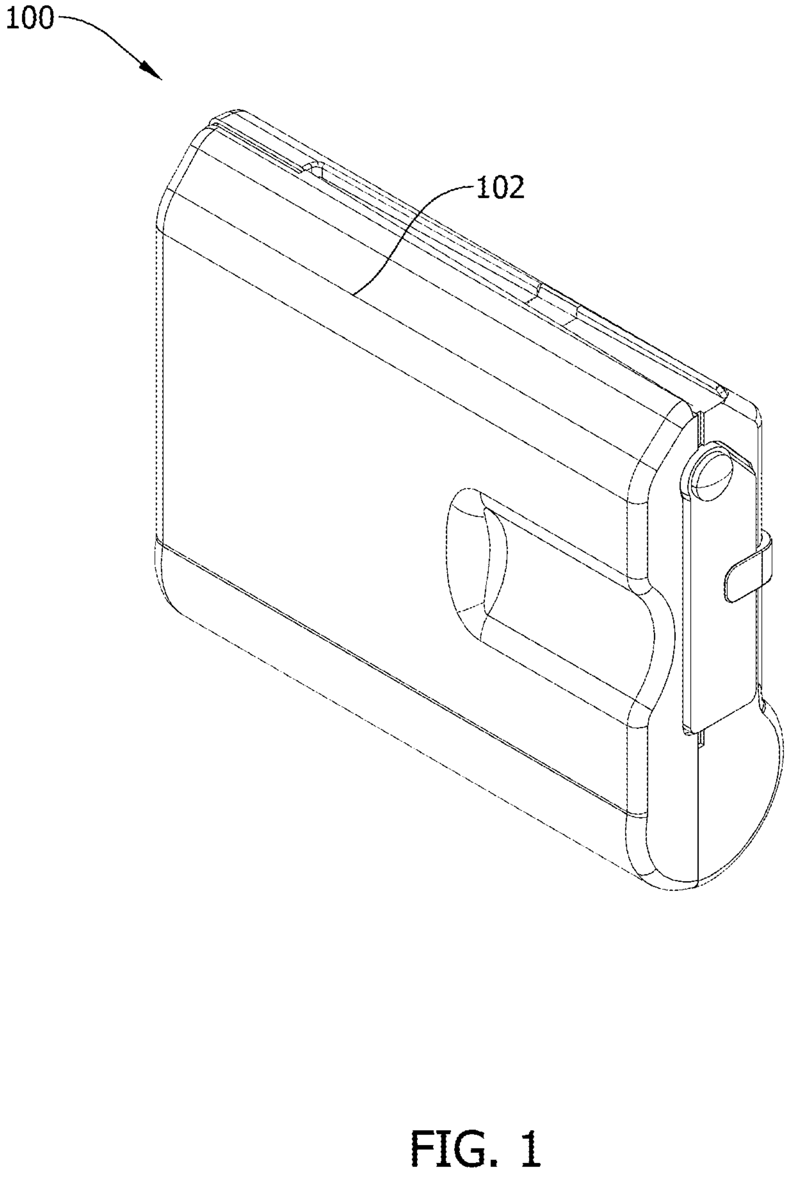
FIG. 1 is perspective view of an electronic device including a housing.
Figure 2:
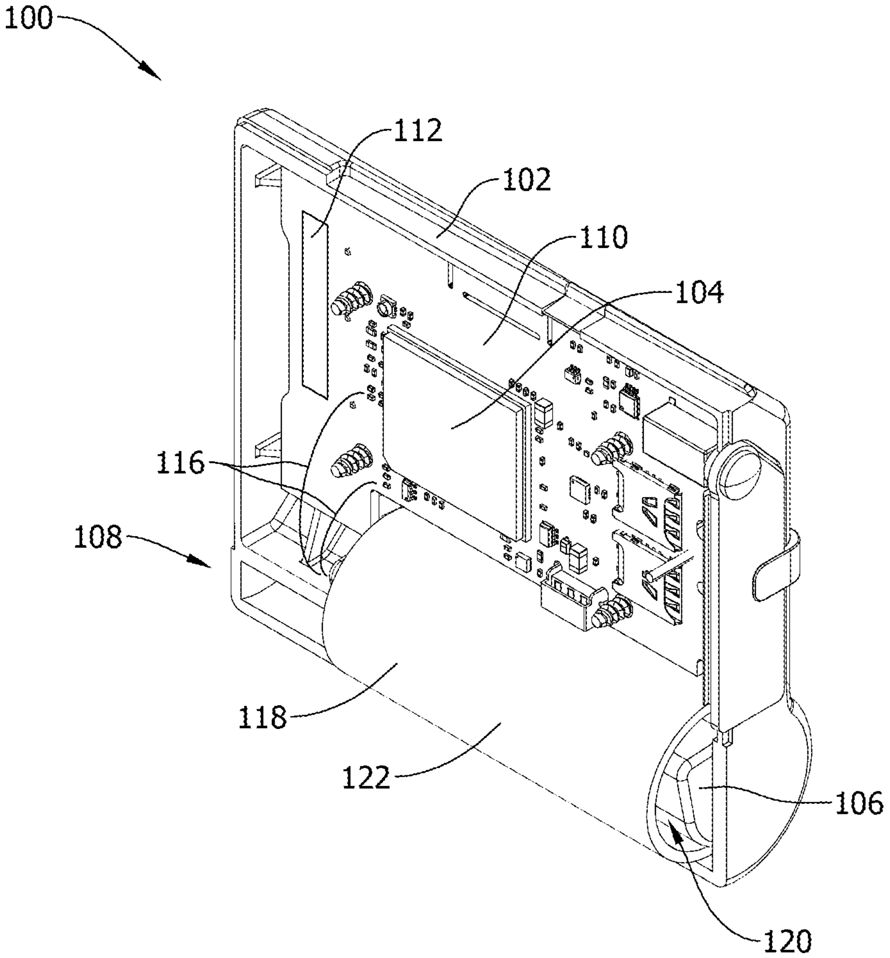
FIG. 2 is a perspective view of the electronic device illustrated in FIG. 1 with a portion of the housing removed.

FIG. 1 is a perspective view of an electronic device 100 including a housing 102. FIG. 2 is a perspective view of the electronic device 100 with a portion of the housing 102 removed. In the illustrated embodiment, the electronic device 100 is a tracking device. In this example, the electronic device 100 is an electronic tracking device including a module or receiver 104 capable of receiving information from an electronic navigation system (not shown) and calculating a position of the electronic device on the earth based on the information received from the electronic navigation system. Suitable electronic navigation systems include satellite navigation systems, radio navigation systems, radar navigation systems, and any other type of navigation system that enables the electronic device 100 to operate as described herein. More specifically, the receiver 104 is capable of receiving information from a global navigation satellite system (GNSS) and calculating a position of the electronic device on the earth based on the information received from the GNSS. Suitable GNSSs include the Global Positioning System (GPS), the GLObal NAvigation Satellite System (GLONASS), the Galileo Navigation System, the BeiDou Navigation Satellite System (BDS), and/or any other global navigation system. Additionally, the receiver 104 may also receive information from regional navigation satellite systems such as the NAVigation with Indian Constellation (NavIC) and/or the Quasi-Zenith Satellite System (QZSS).

The electronic devices 100 described herein are attached to objects and track the location and temperature of the objects. In this example, the electronic device 100 tracks the location and temperature of cargo shipped from one location to another. The electronic device 100 may be attached to or placed in a shipping container and travels with the shipping container. As the shipping container travels, the electronic device 100 receives location information from GPS satellites, calculates the position of the shipping container, and sends the location and temperature information to a central location. Accordingly, the electronic device 100 described herein enables the shipper and/or the shipping company to electronically track shipments, improving logistics by knowing the location and condition of the monitored cargo. In alternative embodiments, the electronic device 100 may be any electronic tracking device.

The electronic device 100 includes a battery 106 that powers the electronic device and a battery protection system 108 that protects the battery from damage. When the shipping container arrives at a location, the shipping container is typically removed from a larger transportation device (cargo ship, train, etc.) to a short term storage location and/or a smaller transportation device (barge, van, truck, etc.) using material moving equipment (forklifts, cranes, hoists, etc.). The electronic device 100 may be damaged as the shipping container is transferred between transportation devices. In some instances, the electronic device 100 may be damaged by the material moving equipment, also damaging the battery 106. The battery protection system 108 protects the battery 106 when the electronic device 100 is subjected to a large force such as a forklift running over the electronic device.

The example battery 106 is a lithium ion battery including an anode including a reductant, a cathode including an oxidant, and a separator separating the anode and the cathode. When the battery 106 is damaged, the separator may be damaged such that the cathode and the anode contact each other, causing the oxidant and the reductant react unfavorably. The battery protection system 108 protects the battery 106 when the large force is applied to the electronic device 100 such that the battery protection system prevents at least one of the following: (1) damage to the battery, (2) the application of a force to the battery, (3) the battery being crushed, (4) damage to the separator, (5) the anode and the cathode contacting each other, and/or (6) the exothermic chemical reaction between the reductant and the oxidant. Accordingly, the electronic devices 100 and the battery protection systems 108 described herein enable electronic tracking of shipments while improving safety of tracking the electronic devices.

Figure 3:
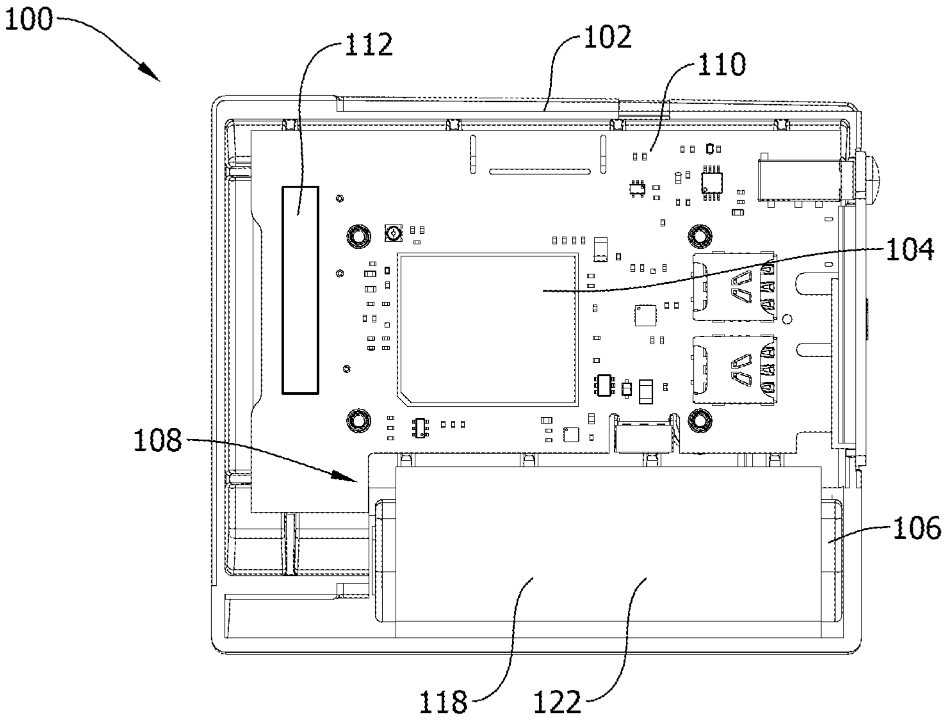
FIG. 3 is a side view of the electronic device illustrated in FIG. 1 with a portion of the housing removed.
Figure 4:
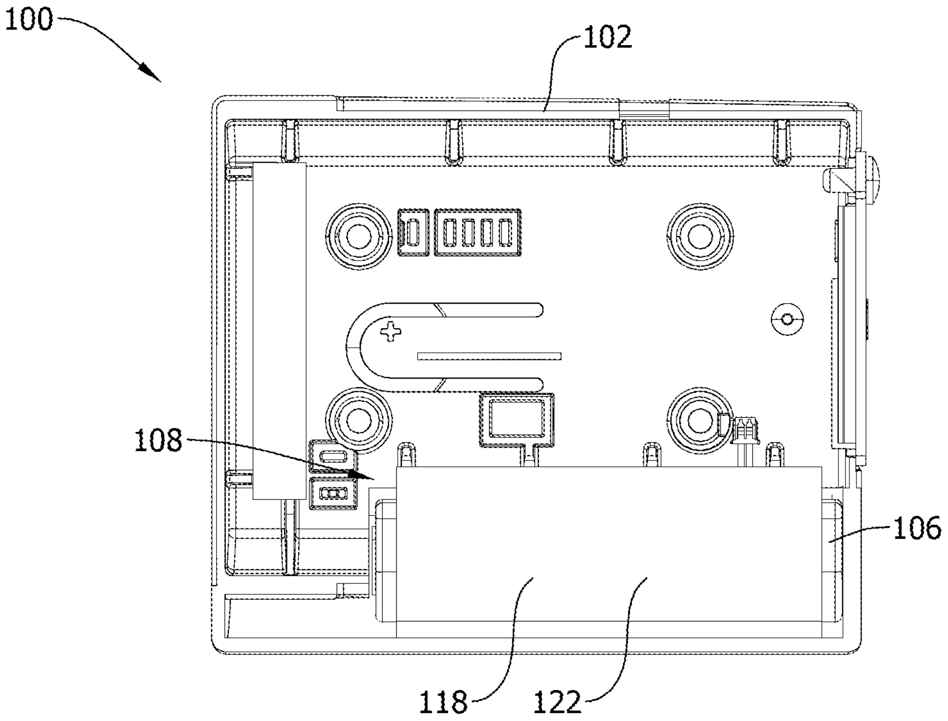
FIG. 4 is a side view of the electronic device illustrated in FIG. 1 with a portion of the housing and electronic components removed.
Figure 5:
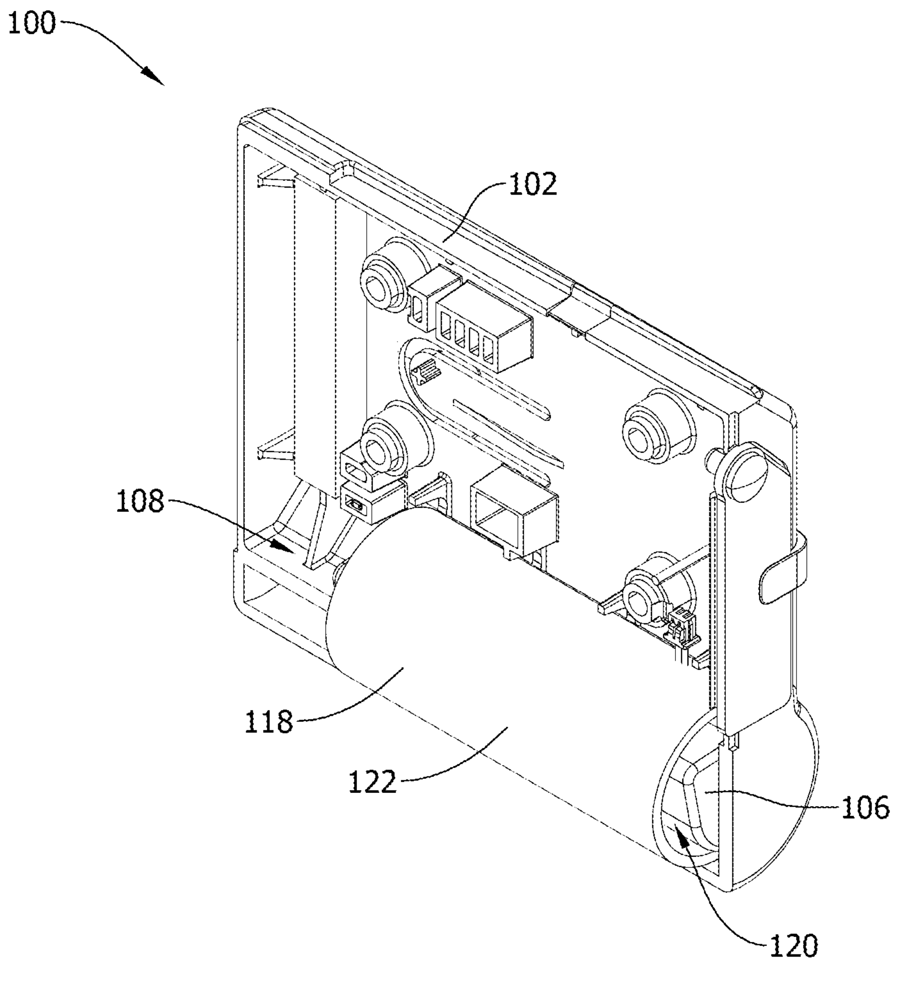
FIG. 5 is a perspective view of the electronic device illustrated in FIG. 1 with a portion of the housing and electronic components removed.

FIG. 3 is a side view of the electronic device 100 with a portion of the housing 102 removed. FIG. 4 is a side view of the electronic device 100 with a portion of the housing 102 and electronic components 110 removed. FIG. 5 is a perspective view of the electronic device 100 with a portion of the housing 102 and electronic components 110 removed. The electronic device 100 includes the housing 102, the receiver 104, the battery 106, the battery protection system 108, the electronic components 110, and an antenna 112. The housing 102 defines a cavity 120 that contains the receiver 104, the battery 106, the battery protection system 108, the electronic components 110, and the antenna 112. In this embodiment, the receiver 104, the electronic components 110, and the antenna 112 are separate components within the electronic device 100. In alternative embodiments, the electronic components 110 include the receiver 104 and the antenna 112 such that the receiver 104, the electronic components 110, and the antenna 112 are a consolidated electronic component.

The receiver 104 receives signals and information broadcast by GPS satellites and transmits the received information to the electronic components 110. The electronic components 110 perform a predetermined set of operations and calculations using the received information to determine a location of the electronic device 100. The electronic components 110 transmit location data to the antenna 112, and the antenna transmits the location data to a central location for tracking. The battery 106 provides electrical power to the receiver 104, the electronic components 110, and the antenna 112 to power the operations described herein. The battery 106 is electrically coupled to the receiver 104, the electronic components 110, and the antenna 112 by a pair of electrical leads 116. As described below, the battery protection system 108 is sized, shaped, and positioned to protect the battery 106 without interfering with the electrical leads 116. Additionally, the battery protection system 108 is positioned away from the receiver 104 and the antenna 112 within the cavity 116 such that the battery protection system does not interfere with signals to and from the receiver 104 and the antenna 112. Additionally, in some embodiments, the battery protection system 108 may be electrically coupled to the antenna 112. Specifically, the battery protection system 108 may be a ground for the antenna 112.

The battery protection systems 108 described herein each include at least one protective structure 118 that defines a protective cavity 120. The battery 106 is positioned within the protective cavity 120 to protect the battery. In a first embodiment illustrated in FIGS. 6-8 and a second embodiment illustrated in FIGS. 10 and 11, the protective structure 118 includes a protective tube 122. The protective tube 122 defines the protective cavity 120, and the battery 106 is positioned within the protective tube. In a third embodiment illustrated in FIGS. 12 and 13, the protective structure 118 includes a first protective rail 124 and a second protective rail 126. The first protective rail 124 is spaced from the second protective rail 126 to define the protective cavity 120 therebetween, and the battery 106 is positioned between the protective rails.

Figure 6:
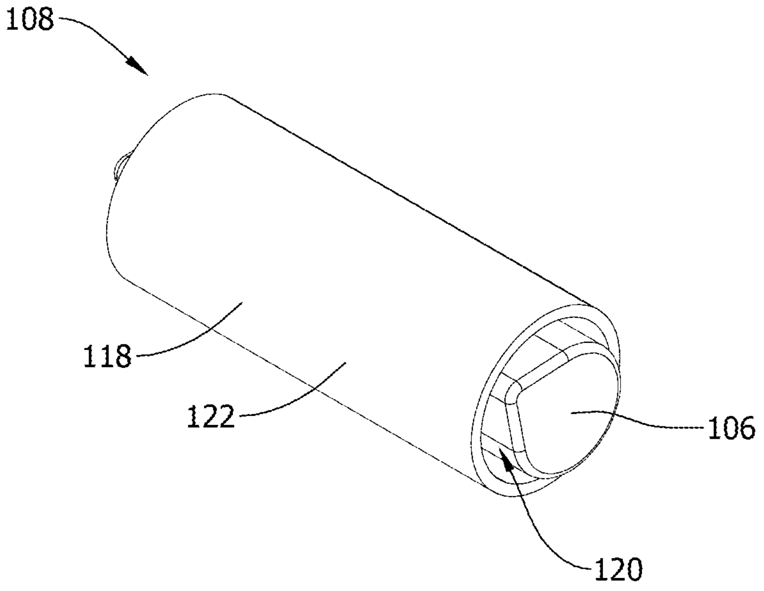
FIG. 6 is a perspective view of a battery and a battery protection system illustrated in FIG. 2.
Figure 7:
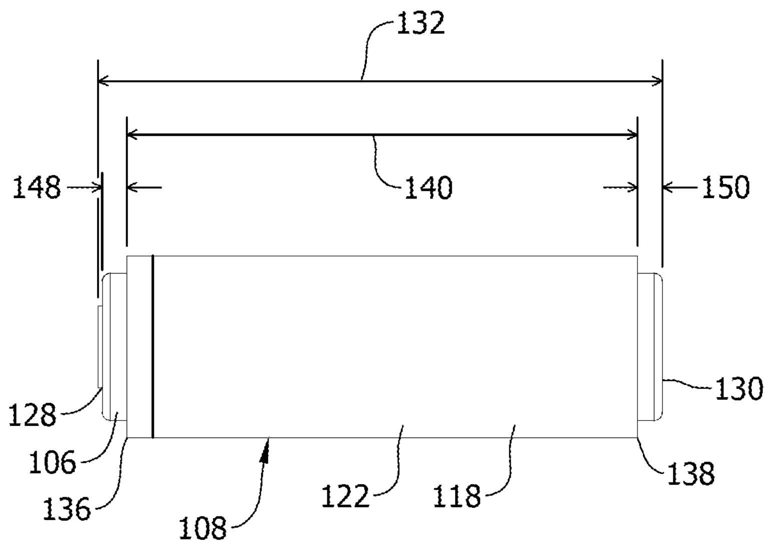
FIG. 7 is a side view of the battery and the battery protection system illustrated in FIG. 2.
Figure 8:
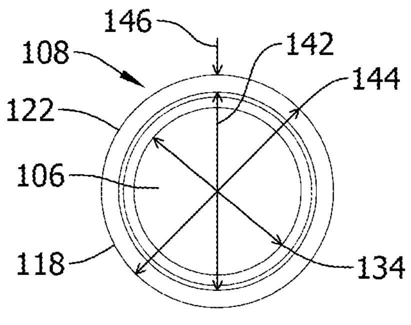
FIG. 8 is an end view of the battery and the battery protection system illustrated in FIG. 2.

FIG. 6 is a perspective view of the battery 106 and the battery protection system 108 of the first embodiment. FIG. 7 is a side view of the battery 106 and the battery protection system 108 of the first embodiment. FIG. 8 is an end view of the battery 106 and the battery protection system 108 of the first embodiment. As discussed above, the protective structure 118 includes the protective tube 122 that defines the protective cavity 120, and the battery 106 is positioned within the protective tube. The battery 106 has a substantially cylindrical shape and has a first end 128, a second end 130, a length 132, and a diameter 134. The battery 106 is suitably a tubular battery including an 18650 lithium-ion rechargeable battery. In alternative embodiments, the battery 106 may be any type of battery and may have any shape that enables the electronic device 100 to operate as described herein. The battery first end 128 and the second end 130 define the length 132 therebetween. The length 132 is suitably in the range of about 60 millimeters (mm) to about 70 mm, about 65 mm to about 70 mm, about 68 mm to about 69 mm, and/or about 68.8 mm. The diameter 134 is suitably in the range of about 15 mm to about 20 mm, about 15 mm to about 19 mm, about 18 mm to about 19 mm, and/or about 18.8 mm. More generally, the battery 106 may have any length 132 and diameter 134 that enables the electronic device 100 to operate as described herein.

The protective tube 122 has a substantially tubular shape and has a first end 136, a second end 138, a length 140, an inner diameter 142, an outer diameter 144, and a thickness 146. The first end 136 and the second end 138 define the length 140 therebetween, and the inner diameter 142 and the outer diameter 144 define the thickness 146 therebetween. In the illustrated embodiment, the length 140 is about 60 millimeters (mm) to about 70 mm, about 60 mm to about 65 mm, about 62 mm to about 63 mm, and/or about 62.3 mm. In the illustrated embodiment, the inner diameter 142 is about 15 mm to about 20 mm, about 15 mm to about 19 mm, about 18 mm to about 19 mm, and/or about 18.92 mm. In the illustrated embodiment, the outer diameter 144 is about 20 mm to about 30 mm, about 20 mm to about 25 mm, about 22 mm to about 23 mm, and/or about 22.23 mm. In the illustrated embodiment, the thickness 146 is about 1 mm to about 5 mm, about 2 mm to about 4 mm, about 3 mm to about 4 mm, and/or about 3.31 mm. The protective tube 122 may have any length 140, inner diameter 142, outer diameter 144, and thickness 146 that enables the electronic device 100 and the battery protection systems 108 to operate as described herein.

As shown in FIG. 8, the inner diameter 142 is greater than the diameter 134 such that the battery 106 is positioned within the protective cavity 120, and the length 132 of the battery 106 is greater than the length 140 of the protective tube 122. Specifically, the inner diameter 142 is greater than the diameter 134 such that the battery 106 is positioned within the protective cavity 120 by sliding the first end 128 of the battery 106 into the second end 138 of the protective tube 122 such that the first end 128 of the battery 106 extends beyond the first end 136 of the protective tube 122 and the second end 130 of the battery extends beyond the second end 138 of the protective tube. In the illustrated embodiment, the first end 128 of the battery 106 extends beyond the first end 136 of the protective tube 122 a first extension distance 148 and the second end 130 of the battery extends beyond the second end 138 of the protective tube a second extension distance 150. The first extension distance 148 and the second extension distance 150 enables the protective tube 122 to protect the battery 106 without interfering with the electrical leads 116. Specifically, the electrical leads 116 are attached to one of the first end 128 and the second end 130 of the battery 106. If the protective tube 122 extends beyond the first and second ends 128 and 130 of the battery 106 and a force is applied to the protective tube, the protective tube may interfere with the electrical leads 116 by pinching or physically contacting the electrical leads. The length 140 of the protective tube 122 relative to the length 132 of the battery 106 enables the protective tube 122 to protect the battery 106 without interfering with the electrical leads 116. Additionally, the first and second ends 136 and 138 of the protective tube 122 are rounded to reduce the likelihood that the first and second ends of the protective tube interfere with the electrical leads 116. In the illustrated embodiment, the first extension distance 148 is about 3 mm to about 4 mm or about 3.5 mm, and the second extension distance 150 is about 2 mm to about 4 mm or about 3 mm.

Figure 9:
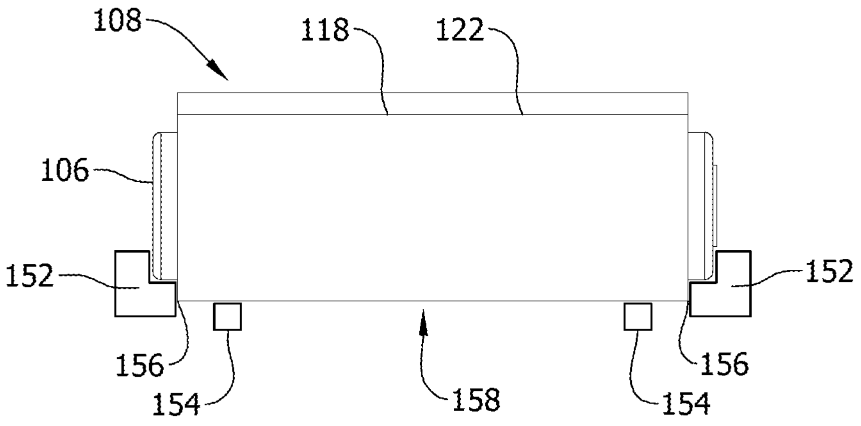
FIG. 9 is a schematic side view of battery and the battery protection system illustrated in FIG. 2.

Additionally, the housing 102 may be arranged to protect the electrical leads 116 while enabling the protective tube 122 to protect the battery 106. Specifically, as illustrated in FIG. 9, the housing 102 may include first supports 152 that support the battery 106 but not the protective tube 122 and second supports 154 that support the protective tube but not the battery. The first supports 152 support the first and second ends 128 and 130 of the battery 106, maintaining a position of the battery that separates the battery from the housing 102. The second supports 154 support the protective tube 122, maintaining a position of the protective tube that separates the protective tube from the housing 102. Additionally, the first supports 152 may be positioned relative to each other such that the ends 156 of the first supports define a protective tube cavity 158. The battery 106 and the protective tube 122 may be positioned relative to the first supports 152 such that the protective tube 122 is positioned within the protective tube cavity 158 but the battery 106 is not positioned within the protective tube cavity. The second supports 154 and the protective tube cavity 158 maintain the protective tube 122 in position within the housing 102. The supports 152 and 154 reduce the likelihood of damage to the electrical leads 116 by separating the battery 106 from the housing, reducing the likelihood of pinching or contact between the protective tube 122 and the electrical leads when a large force is applied to the housing 102 and the protective tube. Additionally, the supports 152 and 154 maintain the position of the battery 106 and the protective tube 122 within the housing 102.

In the illustrated embodiment, the protective tube 122 is made of high strength metal. Specifically, the protective tube 122 is made of a high strength metal such as stainless steel, a structural aircraft streel, aluminum, and/or Structural Aircraft Tubing made with steel alloy 4130. In alternative embodiments, the protective tubing 122 may be made of any high strength material such as titanium. The protective tube 122 may be made from any material that enables the battery protection system 108 to operate as described herein.

The protective tube 122 protects the battery 106 when a large force is applied to the protective tube and the housing 102. The material that forms the protective tube 122, the inner and outer diameter 142 and 144, and the thickness 146 of the protective tube are designed to protect the battery 106 when a 9,000 pound fork lift runs over the electronic device 100 and the protective tube 122. A 9,000 pound fork lift typically exerts a force of 26 Newtons (N)/mm$^2$. Specifically, the material that forms the protective tube 122, the inner and outer diameter 142 and 144, and the thickness 146 are designed such that the protective tube has a crush strength of at least 29 N/mm$^2$. More specifically, the material that forms the protective tube 122, the inner and outer diameter 142 and 144, and the thickness 146 are designed such that the protective tube has a crush strength of about 29 N/mm$^2$ to about 73 N/mm$^2$. Additionally, the protective tube 122 is also designed to protect the battery 106 when a 200 pound operator stands on the electronic device 100, when a shipping container is positioned on the electronic device, and when truck runs over the electronic device. More specifically, the material that forms the protective tube 122, the inner and outer diameter 142 and 144, and the thickness 146 of the protective tube are designed to protect the battery 106 when a force of about 0 N/mm$^2$ to about 435 N/mm$^2$, about 26 N/mm$^2$ to about 435 N/mm$^2$, and/or about 26 N/mm$^2$. Accordingly, the protective tube 122 protects the battery 106 when a large force is applied to the electronic device 100, preventing the battery from smoking, catching on fire, and/or exploding.

Figure 10:
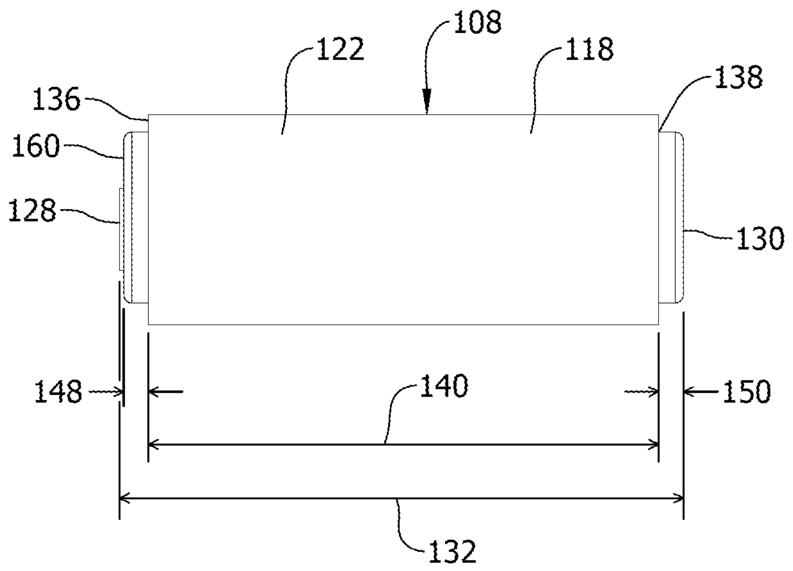
FIG. 10 is a side view of another embodiment of a battery and a battery protection system illustrated in FIG. 2.
Figure 11:
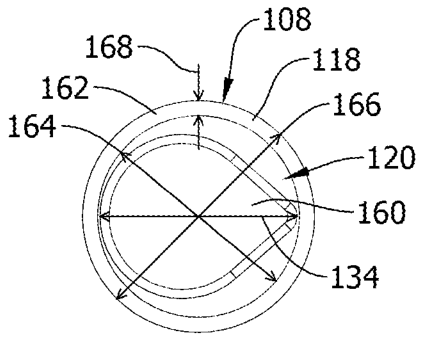
FIG. 11 is an end view of the battery and the battery protection system illustrated in FIG. 10.

FIG. 10 is a side view of a battery 160 and the battery protection system 108 of the second embodiment. FIG. 11 is an end view of the battery 106 and the battery protection system 108 of the second embodiment. The second embodiment is substantially similar to the first embodiment except that the battery 160 of the second embodiment is a safety battery that is larger than battery 106 because the battery 160 includes a protective circuit integrated into the battery 160. The battery protection system 108 of the second embodiment includes a protective tube 162 that has a larger diameter than the protective tube 122 of the first embodiment to accommodate the larger battery 160. In the illustrated embodiment, an inner diameter 164 of the protective tube 162 is about 20 mm to about 25 mm, about 21 mm to about 24 mm, about 22 mm to about 23 mm, and/or about 22.1 mm. In the illustrated embodiment, an outer diameter 166 of the protective tube 162 is about 25 mm to about 30 mm, about 25 mm to about 27 mm, about 25 mm to about 26 mm, and/or about 25.4 mm. In the illustrated embodiment, a thickness 168 of the protective tube 162 is about 1 mm to about 5 mm, about 2 mm to about 4 mm, about 3 mm to about 4 mm, and/or about 3.33 mm. The protective tube 162 may have any inner diameter 164, outer diameter 166, and thickness 168 that enables the electronic device 100 and the battery protection systems 108 to operate as described herein.

The protective tube 162 is made from similar materials as the protective tube 122. The protective tube 162 protects the battery 160 when a large force is applied to the protective tube and the housing 102. The material that forms the protective tube 162, the inner and outer diameter 164 and 166, and the thickness 168 of the protective tube are designed to protect the battery 160 when a 9,000 pound fork lift runs over the electronic device 100 and the protective tube 162. A 9,000 pound fork lift typically exerts a force of 26 $N/mm^2$. Specifically, the material that forms the protective tube 162, the inner and outer diameter 164 and 166, and the thickness 168 of the protective tube are designed such that the protective tube has a crush strength of at least 29 $N/mm^2$. More specifically, the material that forms the protective tube 162, the inner and outer diameter 164 and 166, and the thickness 168 of the protective tube are designed such that the protective tube has a crush strength of about 29 $N/mm^2$ to about 73 $N/mm^2$. Additionally, the protective tube 160 is also designed to protect the battery 160 when a 200 pound operator stands on the electronic device 100, when a shipping container is positioned on the electronic device, and when truck runs over the electronic device. More specifically, the material that forms the protective tube 162, the inner and outer diameter 164 and 166, and the thickness 168 of the protective tube are designed to protect the battery 160 when a force of about 0 $N/mm^2$ to about 435 $N/mm^2$, about 26 $N/mm^2$ to about 435 $N/mm^2$, and/or about 26 $N/mm^2$. Accordingly, the protective tube 162 protects the battery 160 when a large force is applied to the electronic device 100, preventing the battery from smoking, catching on fire, and/or exploding.

Figure 12:
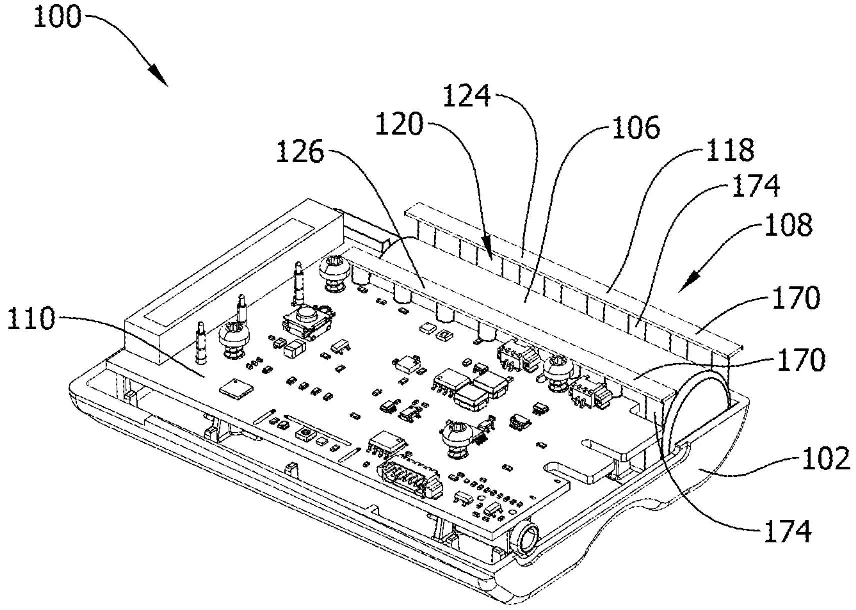
FIG. 12 is a side view of yet another embodiment of a battery and a battery protection system illustrated in FIG. 2.
Figure 13:
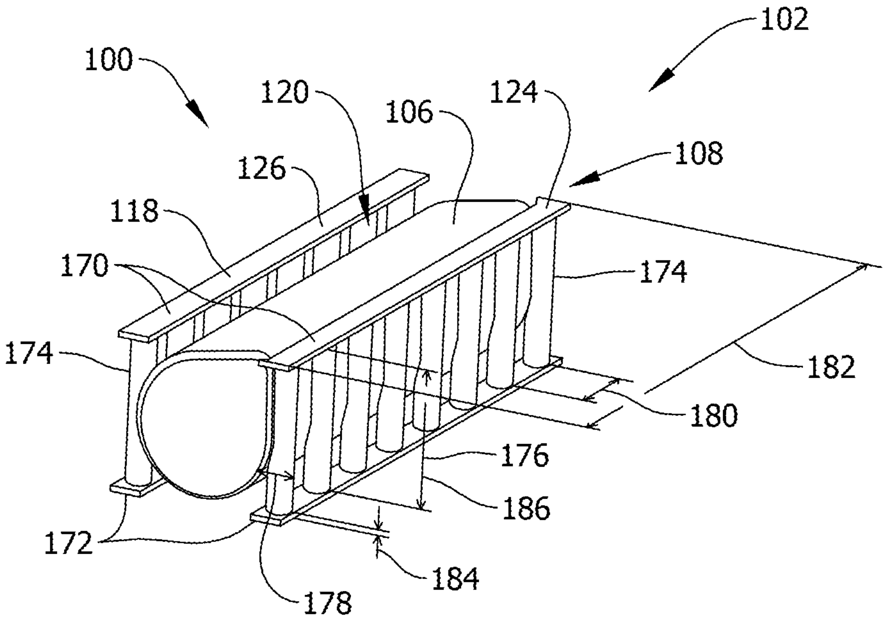
FIG. 13 is an end view of the battery and the battery protection system illustrated in FIG. 12.

FIG. 12 is a perspective view of the electronic device 100 including the battery protection system 108 of the third embodiment with a portion of the housing 102 removed. FIG. 13 is a perspective view of the battery 106 and the battery protection system 108 of the third embodiment. As discussed above, the protective structure 118 includes the first protective rail 124 and the second protective rail 126 spaced from the first protective rail 126 to define the protective cavity 120 therebetween, and the battery 106 is positioned between the protective rails. The first and second protective rails 124 and 126 each include a top rail 170, a bottom rail 172 spaced from the top rail, and pins 174 attached to the bottom rail and the top rail. The top rail 170, the bottom rail 172, and the pins 174 form ladder structures that are positioned on opposite sides of the battery 106 to form the protective cavity 120 and protect the battery.

In the illustrated embodiment, first and second protective rails 124 and 126 each include eight pins 174. In alternative embodiments, first and second protective rails 124 and 126 may include any number of pins 174 that enable the battery protection system 108 to operate as described herein. Each pin 174 is a cylindrical rod having a pin length 176 and a pin diameter 178. In the illustrated embodiment, the pin diameter 178 is about 3 mm to about 3.5 mm. Additionally, the pins 174 are separated from each other by a pin separation distance 180. In the illustrated embodiment, the pin separation distance 180 between pins 174 is uniform. In alternative embodiments, the pin separation distance 180 between pins 174 is not uniform. The top rail 170 and the bottom rail 172 each have a rail length 182 and a rail thickness 184. The first and second protective rails 124 and 126 are spaced from each other a rail separation distance 186 greater than the diameter 134. The top rail 170, the bottom rail 172, and the pins 174 are made from similar materials as the protective tube 122.

The first and second protective rails 124 and 126 protect the battery 106 when a large force is applied to the protective tube and the housing 102. The material that forms the first and second protective rails 124 and 126, the pin diameter 178, the rail thickness 184, and the number of pins 174 of the first and second protective rails are designed to protect the battery 106 when a 9,000 pound fork lift runs over the electronic device 100 and the protective tube 122 (26 $N/mm^2$). A 9,000 pound fork lift typically exerts a force of 26 $N/mm^2$. Specifically, the material that forms the first and second protective rails 124 and 126, the pin diameter 178, the rail thickness 184, and the number of pins 174 of the first and second protective rails are designed such that the first and second protective rails has a crush strength of at least 29 $N/mm^2$. More specifically, the material that forms the first and second protective rails 124 and 126, the pin diameter 178, the rail thickness 184, and the number of pins 174 of the first and second protective rails are designed such that the first and second protective rails has a crush strength of about 29 $N/mm^2$ to about 73 $N/mm^2$. Additionally, the first and second protective rails 124 and 126 is also designed to protect the battery 106 when a 200 pound operator stands on the electronic device 100, when a shipping container is positioned on the electronic device, and when truck runs over the electronic device. More specifically, the material that forms the first and second protective rails 124 and 126, the pin diameter 178, the rail thickness 184, and the number of pins 174 of the first and second protective rails are designed to protect the battery 106 when a force of about 0 $N/mm^2$ to about 435 $N/mm^2$, about 26 $N/mm^2$ to about 435 $N/mm^2$, and/or about 26 $N/mm^2$. Accordingly, the first and second protective rails 124 and 126 protect the battery 106 when a large force is applied to the electronic device 100, preventing the battery from smoking, catching on fire, and/or exploding.

Figure 14:
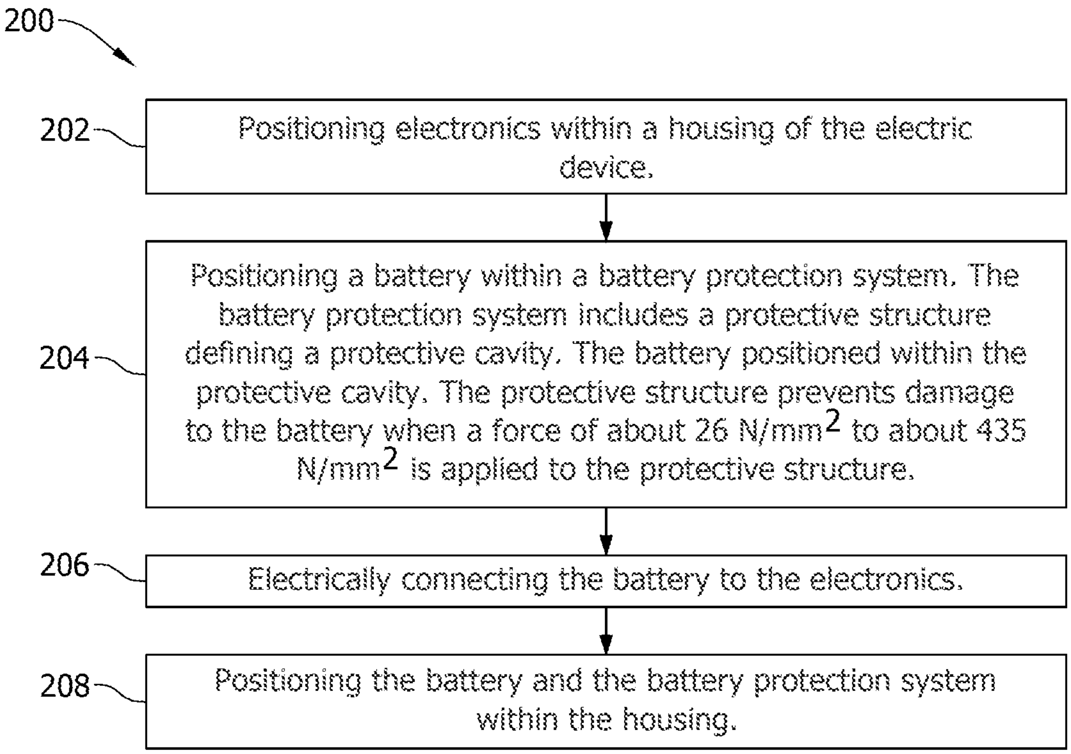
FIG. 14 is a flow diagram of a method of constructing the electronic device illustrated in FIG. 1.

FIG. 14 is a flow diagram of a method 200 of constructing an electronic device. The method 200 includes positioning 202 electronics within a housing of the electric device. The method 200 also includes positioning 204 a battery within a battery protection system. The battery protection system includes a protective structure defining a protective cavity. The battery positioned within the protective cavity. The protective structure prevents damage to the battery when a force of about 26 N/mm$^2$ to about 435 N/mm$^2$ is applied to the protective structure. The method 200 further includes electrically connecting 206 the battery to the electronics. The method 200 also includes positioning 208 the battery and the battery protection system within the housing.

The battery protection systems described herein protect the battery when a force of about 0 N/mm$^2$ to about 435 N/mm$^2$ is applied to the battery protection system. Specifically, battery protection systems described herein include protective structures that define a protective cavity, and the battery is positioned within the protective cavity. In some embodiments, the protective structure is a protective tube, and the battery is positioned within the protective tube. In another embodiment, the protective structure includes a first protective rail and a second protective rail spaced from the first protective rail to define the protective cavity therebetween, and the battery is positioned between the protective rails. The protective structures are made from a high strength metal, such as high strength steel, and the shape and material of the protective structures enables the battery protection systems described herein to protect the battery when a lager force is applied to the battery protection system. For example, the battery protection systems described herein protect the battery when a 9,000 pound fork lift runs over the battery and the battery protection system. Accordingly, the battery protection systems described herein protect the battery when a force of up to about 435 N/mm$^2$ is applied to the battery protection system.

Example embodiments of battery protection systems for electronic devices and methods of constructing the devices are described above in detail. The systems and methods are not limited to the specific embodiments described herein, but rather, components of the system and methods may be used independently and separately from other components described herein. For example, the battery protection systems described herein may be used in systems other than tracking devices.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A tracking device comprising:

a housing comprising:

a plurality of first supports positioned within the housing and positioned relative to each other such that respective ends of the plurality of first supports collectively define a protective tube cavity within the housing; and a plurality of second supports;

an electronic device disposed within the housing;

a battery electrically connected to the electronic device by a pair of electrical leads to power the electronic device; and a battery protection system for protecting the battery, the battery protection system comprising:

a protective structure positioned within the protective tube cavity, the protective structure comprising an open-ended tube extending from a first end to a second end and defining a protective cavity, the battery positioned within the protective cavity such that a gap is defined between an inner diameter of the tube and an outer diameter of the battery;

wherein a first end of the battery extends a first extension distance of about 3 mm to about 4 mm beyond the first end of the protective structure and a second end of the battery extends a second extension distance of about 2 mm to about 4 mm beyond the second end of the protective structure, wherein each of the first and second ends of the battery extends beyond the protective tube cavity and one of the first and second ends of the battery is attached to the pair of electrical leads beyond one of the first and second ends of the protective structure such that the protective structure does not interfere with the electrical leads;

wherein the protective structure prevents damage to the battery when a force of at least 26 Newtons (N)/square millimeter (mm$^2$) to 435 N/mm$^2$ is applied to the protective structure; and wherein the protective structure has a crush strength of at least 29 N/mm$^2$; and wherein the plurality of first supports support and maintain a position of the battery within the housing;

wherein the plurality of second supports support the protective structure but not the battery; and wherein the plurality of second supports and the respective ends of the plurality of first supports maintain a position of the protective structure within the housing.

2. The tracking device of claim 1, wherein the protective structure includes a cylindrical wall having an inner surface, an outer surface, and a thickness therebetween, wherein the thickness is 3.25 millimeters (mm) to 3.35 mm.

3. The tracking device of claim 2, wherein the inner surface defines the inner diameter, and the outer surface defines an outer diameter, wherein the inner diameter is 18.5 millimeters (mm) to 19 mm, and the outer diameter is 22 mm to 22.5 mm.

4. The tracking device of claim 2, wherein the inner surface defines an inner diameter, and the outer surface defines an outer diameter, wherein the inner diameter is 22 millimeters (mm) to 22.5 mm, and the outer diameter is 25 mm to 25.5 mm.

5. A tracking device for cargo comprising:

a housing comprising:

a plurality of first supports positioned within the housing and positioned relative to each other such that respective ends of the plurality of first supports collectively define a protective tube cavity within the housing; and a plurality of second supports;

an electronic device disposed within the housing, wherein the electronic device is configured to:

receive location information;

track a temperature and a location of the tracking device and the cargo;

calculate a position of the cargo, based on the location information; and send the location and the temperature information to a central location;

a battery electrically connected to the electronic device by a pair of electrical leads to power the electronic device; and a battery protection system for protecting the battery, the battery protection system comprising:

a protective structure positioned within the protective tube cavity, the protective structure comprising an open-ended tube extending from a first end to a second end and defining a protective cavity, the battery positioned within the protective cavity such that a gap is defined between an inner diameter of the open-ended tube and an outer diameter of the battery;

wherein a first end of the battery extends a first extension distance of about 3 mm to about 4 mm beyond the first end of the protective structure and a second end of the battery extends a second extension distance of about 2 mm to about 4 mm beyond the second end of the protective structure, wherein each of the first and second ends of the battery extends beyond the protective tube cavity and one of the first and second ends of the battery is attached to the pair of electrical leads beyond one of the first and second ends of the protective structure such that the protective structure does not interfere with the electrical leads;

wherein the protective structure prevents damage to the battery when a force of at least 26 Newtons (N)/square millimeter ($mm^2$) to 435 $N/mm^2$ is applied to the protective structure; and wherein the protective structure has a crush strength of at least 29 $N/mm^2$; and wherein the plurality of first supports support and maintain a position of the battery within the housing;

wherein the plurality of second supports support the protective structure but not the battery; and wherein the plurality of second supports and the respective ends of the plurality of first supports maintain a position of the protective structure within the housing.

* * * * *